(12) United States Patent
Chan et al.

(10) Patent No.: US 10,430,047 B2
(45) Date of Patent: Oct. 1, 2019

(54) MANAGING CONTENT ON AN ELECTRONIC DEVICE

(71) Applicant: Razer (Asia-Pacific) Pte. Ltd., Singapore (SG)

(72) Inventors: Michael A. Chan, San Francisco, CA (US); Justin Quan, San Francisco, CA (US); Brian Chu, San Mateo, CA (US); Aanchal Jain, Brisbane, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 542 days.

(21) Appl. No.: 14/835,993

(22) Filed: Aug. 26, 2015

(65) Prior Publication Data

US 2015/0365491 A1    Dec. 17, 2015

Related U.S. Application Data

(63) Continuation-in-part of application No. 14/674,048, filed on Mar. 31, 2015, now Pat. No. 10,057,726.

(Continued)

(51) Int. Cl.
| | |
|---|---|
| G06F 17/30 | (2006.01) |
| G06F 3/0484 | (2013.01) |
| H04L 29/08 | (2006.01) |
| H04W 4/029 | (2018.01) |
| H04L 29/06 | (2006.01) |
| H04N 21/274 | (2011.01) |
| H04N 21/4335 | (2011.01) |
| H04N 21/4402 | (2011.01) |
| G06F 3/0488 | (2013.01) |
| G06F 3/0485 | (2013.01) |

(Continued)

(52) U.S. Cl.
CPC ........ *G06F 3/04842* (2013.01); *G06F 3/0485* (2013.01); *G06F 3/0488* (2013.01); *G06F 3/04817* (2013.01); *G06F 16/125* (2019.01); *G06F 16/51* (2019.01); *H04L 65/4084* (2013.01); *H04L 65/80* (2013.01); *H04L 67/06* (2013.01); *H04L 67/10* (2013.01); *H04L 67/1097* (2013.01); *H04N 21/274* (2013.01); *H04N 21/4335* (2013.01); *H04N 21/440263* (2013.01); *H04W 4/029* (2018.02); *H04L 67/2828* (2013.01)

(58) Field of Classification Search
CPC ................................................. G06F 17/30244
USPC ................................................. 707/661, 664
See application file for complete search history.

(56) References Cited

U.S. PATENT DOCUMENTS

| 8,509,488 B1* | 8/2013 | Enge .................. G01C 21/3623 |
| | | 382/106 |
| 9,383,947 B2* | 7/2016 | Sinn ..................... G06F 3/1204 |

(Continued)

*Primary Examiner* — Baoquoc N To
(74) *Attorney, Agent, or Firm* — Mattingly & Malur, PC

(57) ABSTRACT

In some examples, an electronic device may reduce the resolution or otherwise downsize content items to conserve storage space on the electronic device. Further, the electronic device may offload full resolution versions of content items that have been downsized, and the full resolution versions may be stored at a cloud storage or other network storage location. Subsequently, if the user, an operating system module, or an application on the electronic device requests a higher resolution version of the downsized content item, the higher resolution version may be downloaded from the network storage to the electronic device. Various techniques may be used for determining a size or resolution of the content item to download from the network storage.

18 Claims, 8 Drawing Sheets

Related U.S. Application Data which is a continuation-in-part of application No. 14/180,021, filed on Feb. 13, 2014, now Pat. No. 9,811,329, which is a continuation of application No. PCT/US2013/063003, filed on Oct. 2, 2013.

(60) Provisional application No. 61/708,794, filed on Oct. 2, 2012, provisional application No. 62/067,532, filed on Oct. 23, 2014.

(51) Int. Cl.
*G06F 3/0481* (2013.01)
*G06F 16/11* (2019.01)
*G06F 16/51* (2019.01)

(56) References Cited

U.S. PATENT DOCUMENTS

| | | | |
|---|---|---|---|
| 2002/0196344 A1* | 12/2002 | McIntyre | G06Q 30/06 348/207.1 |
| 2002/0196986 A1* | 12/2002 | McIntyre | H04N 1/00132 382/299 |
| 2002/0198936 A1* | 12/2002 | McIntyre | G11B 27/105 709/203 |
| 2003/0007200 A1* | 1/2003 | McIntyre | G06Q 20/387 358/527 |
| 2003/0009527 A1* | 1/2003 | McIntyre | G06F 17/30247 709/206 |
| 2003/0009568 A1* | 1/2003 | McIntyre | G06F 17/3028 709/229 |
| 2003/0009569 A1* | 1/2003 | McIntyre | G06Q 30/06 709/229 |
| 2004/0201709 A1* | 10/2004 | McIntyre | H04N 1/00307 348/211.2 |
| 2015/0081906 A1* | 3/2015 | Backholm | H04W 74/06 709/225 |
| 2015/0286444 A1* | 10/2015 | Sinn | G06F 3/1204 358/2.1 |

* cited by examiner

MANAGING CONTENT ON AN ELECTRONIC DEVICE

CROSS-REFERENCES TO RELATED APPLICATIONS

This application is a continuation-in-part of U.S. patent application Ser. No. 14/674,048, entitled "MANAGING USER DATA ON AN ELECTRONIC DEVICE", filed on Mar. 31, 2015, which is a continuation-in-part of U.S. patent application Ser. No. 14/180,021, entitled "CLOUD BASED FILE SYSTEM SURPASSING DEVICE STORAGE LIMITS", filed on Feb. 13, 2014, which is a continuation of International Application No. PCT/US2013/063003, entitled "CLOUD BASED FILED SYSTEM SURPASSING DEVICE STORAGE LIMITS", filed on Oct. 2, 2013, which claims the benefit of U.S. Provisional Patent Application No. 61/708,794, entitled "CLOUD COMPUTING INTEGRATED OPERATING SYSTEM", filed on Oct. 2, 2012, all of which applications are incorporated by reference herein in their entireties for all purposes. This application further claims the benefit of U.S. Provisional Patent Application No. 62/067,532, entitled "LIMITLESS STORAGE" filed on Oct. 23, 2014, which is incorporated by reference herein in its entirety for all purposes.

BACKGROUND

People use electronic devices for communication, socializing, entertainment, work, navigation, web browsing, and a variety of other functions. However, electronic devices typically have limited storage space, thus restricting the amount of data that a person may maintain on a particular electronic device. For example, people often keep various different types of digital content items on their electronic devices, such as photographs, videos, music, and so forth, and like to have sufficient free storage space to allow the addition of more content items when desired without having to first delete existing content items. Further, while a person may be able to store additional data with a cloud storage service, the data stored at the cloud storage service may not always be readily accessible.

SUMMARY

Some implementations herein include techniques and arrangements for managing data available to a user on an electronic device. For instance, full resolution versions of content items may be offloaded to a remote network-accessible storage, such as a cloud storage or other network storage location. The resolution of the version of a content item retained on the electronic device may be reduced or otherwise downsized to conserve storage space on the electronic device. If the user, an operating system module, or an application requests a higher resolution version or the full resolution version of the content item at a later point in time, the higher or full resolution version of the content item may be fetched from the network storage to the electronic device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
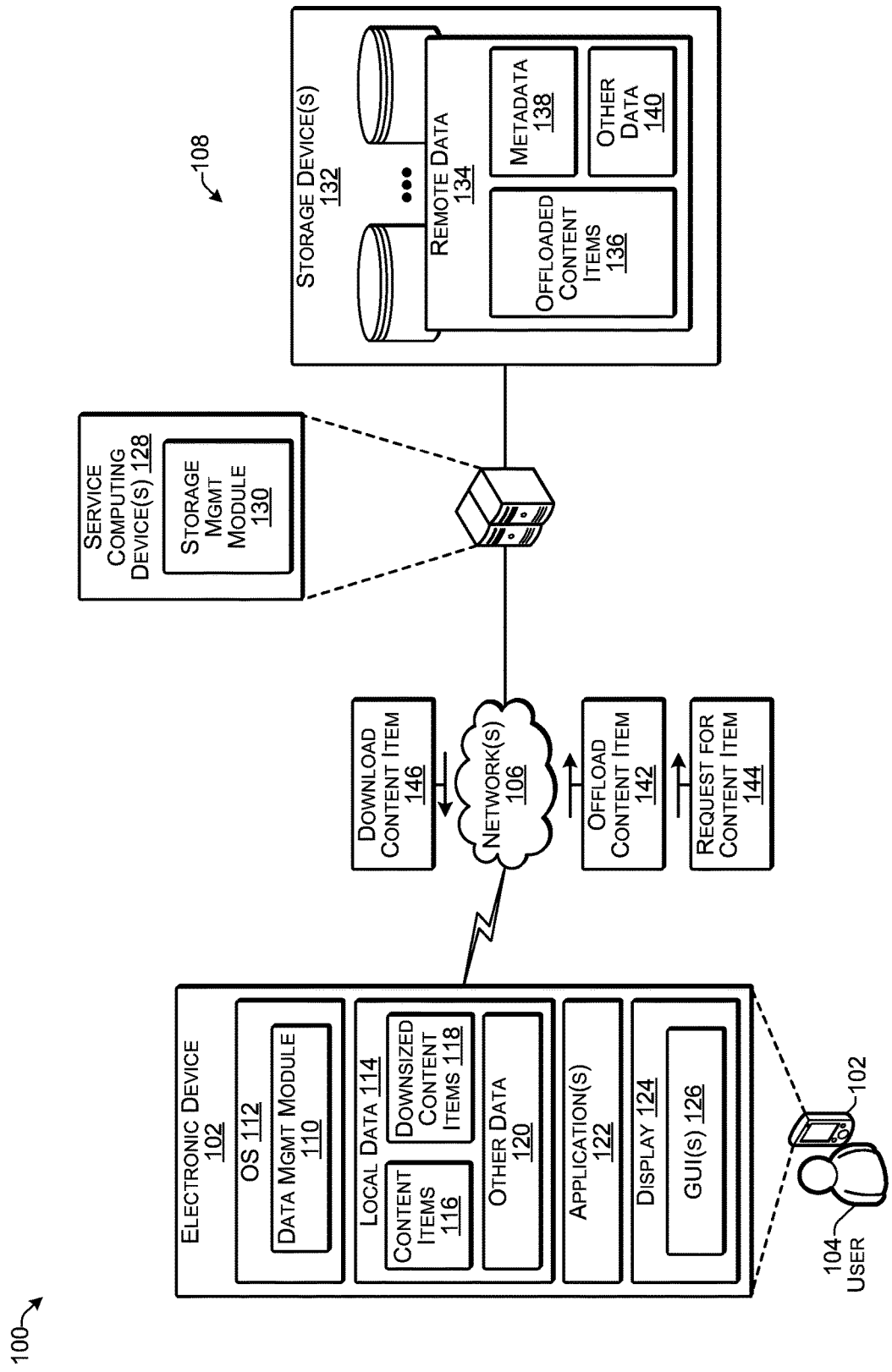
FIG. 1 illustrates an example system for enabling content management on an electronic device according to some implementations.

Some examples herein are directed to management of content on an electronic device. For instance, the electronic device may offload full resolution versions of content items to a remote network-accessible storage, such as a cloud storage or other network storage location. Examples of content items that may be offloaded by the electronic device include, but are not limited to, photographs and other images, videos, movies, TV shows, audio recordings, music, books, text documents, and any other data that may be stored at different levels of resolution and/or different levels of compression.

As one example, the electronic device may reduce the size of a locally stored image following offloading of a full resolution version of the image to a network storage location. Subsequently, a module of the operating system (OS) and/or a third party application on the electronic device may attempt to access the image, such as in response to a user input, e.g., for presenting the image on a display, uploading the image to a social media site, editing the image with a photo editing application, or for any of numerous other purposes. In response, the electronic device may determine the location of a higher resolution version of the image at the network storage and may obtain and provide the higher resolution version of the image to the third party application. For instance, depending on the intended purpose for downloading the image, rather than downloading the full resolution version of the image, the electronic device might download a version that is of lower resolution than the full resolution version, but higher resolution than the version currently stored on the electronic device.

From the perspective of the operating system (OS) of the electronic device, at least three different types of situations might trigger downloading of the image from the network storage. As a first example, a module of the OS, such as a gallery module, a picture viewer, or other image presentation module of the OS may present at least some of the images stored on the electronic device to the user, such as in a gallery type of display or any other type of user interface. The user may select a particular one of the images from the gallery and, in response to the user selection, the OS may download a higher resolution version of the selected image from the network storage.

As another example, the user may use an application on the electronic device that works with a document provider user interface (UI) that is integrated at the framework level of the OS of the electronic device. For instance, some third party applications may be designed to interact directly with the document provider UI for accessing images and other documents maintained on the electronic device. Thus, the third party application on the electronic device may utilize the document provider UI of the OS when accessing the image and/or other content items on the electronic device. Further, the electronic device may identify the application and may determine which higher resolution version of the image to provide to the application based on the identity of the determined application.

Additionally, some examples include a proxy file system that may execute, at least in part, in the user space. The proxy file system may enable additional logic to be performed in response to a call to access a content item. For instance, in response to receiving a request for a content item at the proxy file system, the electronic device may first check local storage for a suitable version of the content item. If a suitable version of the content item having a specified resolution is not available in the local storage, the electronic device may send a communication to the network storage to fetch the requested version of the content item.

In some implementations, rather than interacting with the document provider UI, a third party application may attempt to directly access the image via the file system without employing the document provider UI. The electronic device may analyze the read calls received from the third party application to determine which of the read calls require a higher resolution version of the image. The electronic device may fetch, from the network storage, the higher resolution image associated with an identified read call and provide the higher resolution image to the third party application transparently to the user.

Additionally, in some examples, one or more application programming interfaces (APIs) may be used by an application to access the image, and may explicitly require a particular resolution for the image being retrieved. For instance, a resolution specified in the read call may be used to determine whether the original full resolution image, or a different level of resolution, is to be obtained from the network storage location. For example, the OS may distinguish between a read call being a call for a specific image and a read call being part of an image gallery folder access. Based on the distinction, the OS may determine whether to fetch the original full resolution version or other higher resolution version from the network storage location, or to merely fetch the version of the image currently stored in local storage on the electronic device.

In some cases, the electronic device may automatically determine and control which content is stored on the electronic device and which content is stored at the network storage location associated with the user. Thus, the electronic device may create space in the local storage by moving or otherwise offloading full resolution versions of content items off the electronic device for storage at the network storage. As one example, the electronic device may automatically offload the full resolution content items to the network storage, such as based on one or more user preferences or various other factors as discussed below. As another example, the user may be presented with a list of items to be offloaded and the user may approve, or otherwise select the items to be offloaded from the electronic device. Further, since the user data on the electronic device may be regularly backed up or otherwise synchronized with the user data at the network storage, in some examples, offloading a particular piece of data from the electronic device to the network storage may merely include ensuring the latest version of the particular item has already been synchronized with the network storage, and indicating that the particular item is to be downsized locally.

The electronic device may take into consideration a plurality of factors when determining content items to recommend for offloading. For instance, based on one or more user data usage models, priority rules, expressed user preferences, or other user data ranking techniques, the electronic device may determine which content items to offload. As one example, the electronic device may rank the content items, at least in part based on the recentness associated with particular content items. For example, content items, such as photos and videos that are not expected to be frequently accessed may be offloaded, at least in part, based on age. For instance, higher resolution versions of newer photos and videos may be retained on the electronic device for a period of time. After the period of time has elapsed, the photos and videos may be downsampled to lower resolution versions that are retained in the local storage of the electronic device, while the higher resolution versions are offloaded to the network storage. Accordingly, all of the user's photos and videos may be retained on the electronic device, but the older photos and videos may be retained at a lower resolution than that of the more recent photos and videos, thereby freeing up storage space on the electronic device for additional user data.

For discussion purposes, some example implementations are described in the environment of a module on an electronic device that manages content items available on the electronic device based on various priorities or other considerations. However, implementations herein are not limited to the particular examples provided, and may be extended to other types of devices, other types of use data, other module execution environments, other system architectures, other techniques for determining data priorities, and so forth, as will be apparent to those of skill in the art in light of the disclosure herein.

FIG. 1 illustrates an example system 100 for enabling management of content items according to some implementations. For instance, the system 100 may enable an electronic device 102 associated with a user 104 to communicate over one or more networks 106 with a network storage 108. The electronic device 102 may be any suitable type of computing device, e.g., mobile, semi-mobile, semi-stationary, or stationary. Some examples of the electronic device 102 may include smart phones, tablet computing devices, wearable computing devices, body-mounted computing devices, and other types of mobile devices; laptops, netbooks, and other mobile computers or semi-mobile computers; desktop computing devices, terminal computing devices and other semi-stationary or stationary computing devices; augmented reality devices, gaming systems, or any of various other computing devices capable of storing data, sending communications, and performing the functions according to the techniques described herein. Further, while a single user 104 and associated electronic device 102 are illustrated in this example, in other examples, there may be a large number of users 104, each having one or more respective electronic devices 102.

The electronic device 102 may include a data management module 110 that executes on the electronic device 102.

The data management module 110 may provide application management functionality to the electronic device 102 for controlling which applications are maintained locally on the electronic device 102. In some examples, the data management module 110 may be one or more modules of an operating system (OS) 112 on the electronic device 102. In other examples, the data management module 110 may be one or more modules that are separate from the OS 112, such as may be included in one or more applications executable on the electronic device 102. For instance, the data management module 110 may have permission for system-level access to user applications and/or data stored on the electronic device 102. In addition, while the data management module 110 is illustrated in this example as residing on the electronic device 102, in other examples, at least some of the functionality of the data management module 110 may reside on another suitable computing device in communication with the electronic device 102.

The electronic device 102 may further include local data 114, which may include one or more full resolution content items 116 that are maintained locally on the electronic device 102. The local data 114 may further include one or more downsized content items 118, which may be lower resolution versions of content items that have been offloaded from the electronic device 102 to the network storage 108. In addition, the local data 114 may include other data 120. Examples of other data 120 may include application data, application metadata data, data used by the OS 112, data used by other programs on the electronic device, and/or other types of user or device data.

In addition, the electronic device 102 may include one or more applications 122, which may be installed on the electronic device for performing various functions on the electronic device 102. For instance, the applications 122 may often be developed by third parties (e.g., different from the developer of the OS), and may be downloaded and installed on the electronic device 102. The applications 122 may perform functions based on a platform provided by the OS 112, and may typically interact with some features of the OS 112.

Further, the electronic device may include a display 124 for presenting various types of visual information to the user, such as one or more graphic user interfaces (GUIs) 126, as well as content items, text, images, virtual controls, or other information. Further, while several components and data of the electronic device 102 are described and illustrated in this example, numerous other components and data may be included in the electronic device 102, as discussed additionally below and/or as will be apparent to those of skill in the art having the benefit of the disclosure herein.

In the illustrated example, the network storage 108 includes one or more service computing devices 128 that include a storage management module 130. Further, the service computing device 128 may include, or may be in communication with, one or more storage devices 132, such as by direct connection or via the one or more networks 106. In some examples, the network storage 108 may be provided by a service provider. For instance, various service providers may provide commercial cloud storage or other network storage to the public, typically for a monthly or yearly fee based at least in part on the amount of storage space consumed by an individual user. However, implementations herein are not limited to commercial network storage services, and may be extended to other types of network-accessible storage and storage services. As several alternative examples, the network storage 108 may be a network-attached storage (NAS), a server computing device, a desktop computing device, or the like, such as may be maintained by the user 104 or other entity.

The one or more networks 106 can include any suitable network, including a wide area network, such as the Internet; a local area network, such as an intranet; a wireless network, such as a cellular network; a local wireless network, such as Wi-Fi; close-range wireless communications, such as BLUETOOTH®; a wired network, such as fiber or Ethernet; or any other suitable network, or any combination thereof. Accordingly, the one or more networks 106 may include both wired and/or wireless communication technologies. Components used for such communication technologies can depend at least in part upon the type of network and/or the environment selected. Protocols for communicating over such networks are well known and will not be discussed herein in detail. Accordingly, the electronic device 102 and the service computing device 128 are able to communicate over the one or more networks 106 using wired or wireless connections, and combinations thereof.

The storage management module 130 on the service computing device 128 may manage the storage of remote data 134 of the user 104 stored on the storage devices 132, and may control access to the remote data 134. In the case that the network storage 108 is provided by a commercial storage service, the storage devices 132 may be enterprise level storage arrays, such as may be maintained in a storage area network, a NAS cluster, a RAID (redundant array of independent disks) array, a distributed storage node array, or various other types of storage configurations. The storage devices 132 may store offloaded content items 136 that have been offloaded from the electronic device 102, as well as associated metadata 138. In addition, the storage devices 132 may store other data 140 of the user, such as backup versions of the user's applications, application data, and/or various other user data.

In some implementations, the data management module 110 may dynamically manage the amount of available storage on the electronic device 102 by offloading some full resolution content items 116 from the electronic device 102. Thus, as indicated at 142, the data management module 110 may create space in the local storage by moving one or more full resolution (or higher resolution) content items 116 off the electronic device 102 for storage at the network storage 108. In some cases, the data management module 110 may automatically offload the content item 116 to the network storage 108, such as based on one or more user preferences or various other criteria. In other cases, prior to moving one or more content items 116 off the electronic device 102, the data management module 110 may present the user 104 with a list or range of content items to be offloaded and the user 104 may approve, disapprove, or otherwise determine the content items to be offloaded from the electronic device 102.

Further, prior to offloading the one or more content items 116, the data management module 110 may generate a corresponding downsized content item 118 for each content item 116 that will be offloaded. For instance, the data management module 110 may use any of various techniques for downsampling, compressing, reducing the resolution, or otherwise downsizing the content items 116 to generate a downsized content item 118. Particular programs and/or algorithms used to downsize the content items 116 may depend at least in part on the file type of the content item 116 and are well known to those of skill in the art.

The data management module 110 may take into consideration one or more criteria when determining which content items 116 to offload or to recommend for offloading. For instance, based on one or more user data usage models, priority rules, expressed user preferences, or other content item ranking techniques, the data management module 110 may determine which content items 116 to offload. As one example, the data management module 110 may rank the content items 116, based at least in part on how recently each content item has been added to the local storage, how often each content item has been accessed, how much storage space each content item uses, or a combination thereof. For instance, content items 116 that are older than other content items 116 that have not yet been offloaded may be automatically offloaded to the network storage 108 (or recommended for offloading). Thus, a content item 116 may be offloaded based on expiration of a threshold length of time since the content item 116 was added to the local storage, based on expiration of a threshold length of time since last access, based on how frequently the content item 116 has been accessed over a period of time, based on the content item 116 using a threshold amount of storage space, based on the amount of storage space remaining on the electronic device 102 falling below a threshold level, or the like. In some cases, the downsizing and offloading may take place when the electronic device 102 is otherwise not in use, such as when the electronic device 102 is in a standby mode, connected to Wi-Fi, and plugged in to a power source.

The storage management module 130 at the network storage 108 may receive an offloaded content item 136 and any associated metadata 138, and may store these in association with a user account associated with the user 104 and/or the electronic device 102. As one example, a full resolution copy of the content item 136 may be stored at the network storage 108 in association with a cloud storage account of the user 104 of the electronic device 102. In some cases, at least some metadata 138 associated with the offloaded content item 136, such as information about the corresponding content item 136 (e.g., date created, location created, original size, author, runtime, etc.) may also be stored at the network storage 108.

Additionally, in some examples, the content items 116 on the electronic device 102 may have already been previously synchronized with the network storage location 108 or otherwise backed up to the network storage location 108. For instance, the data management module 110 may be configured to regularly backup the content items 116 to the storage devices 132. Accordingly, since a content item 116 to be offloaded from the electronic device 102 already exists at the remote data 134, it is not necessary for the content item 116 to actually be sent again to the network storage 108. Instead, because a copy of the offloaded content item 136 is already stored at the network storage 108, the offloading of a content item 116 on the electronic device 102 may merely involve creating a downsized version 118 of the particular content item 116 and marking the storage location of the particular content item 116 in the local storage of the electronic device 102 as being free. Thus, the local storage space is freed up and the content item 116 may be overwritten in due course.

In addition, for each offloaded content item 136, the storage management module 130 or the data management module 110, may generate other sizes of the content item 136 (not shown in FIG. 1). For instance, in addition to maintaining a full resolution version of the offloaded content item 136, the network storage 108 may also maintain other smaller resolution sizes, such as a small, medium, and large resolution size of each content item 136. As one example, the large resolution version may be 75% of the full resolution size, the medium resolution version may be 50% of the full resolution size, and the small resolution version may be 25% of the full resolution size, or any of numerous other ranges of sizes may be used. Further, there may be more or fewer versions of the content item 136, other than small, medium, and large.

In addition, in some implementations, the data management module 110 may downsize the content items 116 incrementally. For instance, one or more content items 116 may be initially downsized from full resolution to downsized content items 118 of a size that is, e.g., 75% of full resolution. Following expiration of a threshold period of time, the one or more downsized content items 118 may be downsized again to a smaller size, e.g. 50% of full resolution. Subsequently, following expiration of another threshold period of time, the one or more downsized content items 118 may be downsized again to a smaller size, e.g., 25% of full resolution. Subsequently, follow expiration of another threshold period of time, the one or more downsized content items 118 may be downsized again to an even smaller size, e.g., 10% of full resolution. Alternatively, in other examples, the content items 116 may be downsized directly to a desired smallest resolution, e.g., 5% or 10% of full resolution, such as before the full resolution content item 116 is offloaded to the network storage 108.

Furthermore, in some cases, the one or more GUIs 126 may enable the user to interact with the electronic device 102 to accomplish data management on the electronic device 102 and the network storage 108. For instance, the GUIs 126 may provide the user with an opportunity to select and/or approve content items 116 to be offloaded from the electronic device 102. The data management module 110 may present in the one or more GUIs 126 a listing or range of the content items 116 that are to be offloaded, or that are recommended to be offloaded from the electronic device 102. For instance, the content items 116 recommended for offloading may be presented in a ranked order, such as based on a likelihood that the user 104 will not be likely to access the recommended content items 116, or based on any of the other criteria enumerated above for selecting a content item for offloading. The user 104 may interact with the GUIs 126 to confirm, select, and/or reject the content items 116 recommended to be offloaded. Alternatively, in some examples, such as based on data management settings previously selected or otherwise approved by the user 104, the data management module 110 may automatically offload one or more content items 116 based on any of the criteria listed above for selecting a content item 116 for offloading.

As still another example, the electronic device 102 may automatically and dynamically offload some content items 116 when local storage space falls below a threshold level, such as to enable the user 104 to continue to add new data to the local storage on the electronic device 102. For example, suppose that the user 104 is using the electronic device 102 to take photographs or video. Further, suppose that the data management module 110 determines that that the electronic device 102 is close to running out of storage space, e.g., has a threshold amount of storage capacity remaining. If the electronic device 102 is able to communicate with the network storage 108, the data management module 110 may offload content items 116 earlier than scheduled. For instance, if the electronic device 102 is in communication with the network storage 108, the data management module 110 may downsize older photos, videos, etc., and offload the full resolution versions of these content items while the user 104 continues to take new photos or videos. Alternatively, if the electronic device 102 is offline, the data management module 110 may downsample content items that have previously been backed up to the network storage 108, or may overwrite on the electronic device 102 other user data that is already backed up to the network storage 108 to enable the user 104 to continue to take pictures, videos, or the like. The determination regarding which content items 116 to overwrite may be based at least in part on the content item rankings mentioned above.

After a particular content item has been downsized and offloaded from the electronic device 102, the user 104, the OS 112, or an application 122 on the electronic device 102 may attempt to access the particular content item. For instance, the user 104 may make an input to an OS GUI or an application GUI to select or otherwise access a particular content item. In such an occurrence, the data management module 110 may send a request 144 to the network storage 108 for the content item 136. For instance, the request 144 may request the full resolution version of the content item 136, or a different resolution version in some examples. In response, as indicated at 146, the storage management module 130 may send the requested version of the content item to the electronic device 102. The data management module 110 may receive the requested content item 136 and may present the content item 136 on the display 124, or perform other instructed action, such as providing the content item to an application 122.

Figure 2:
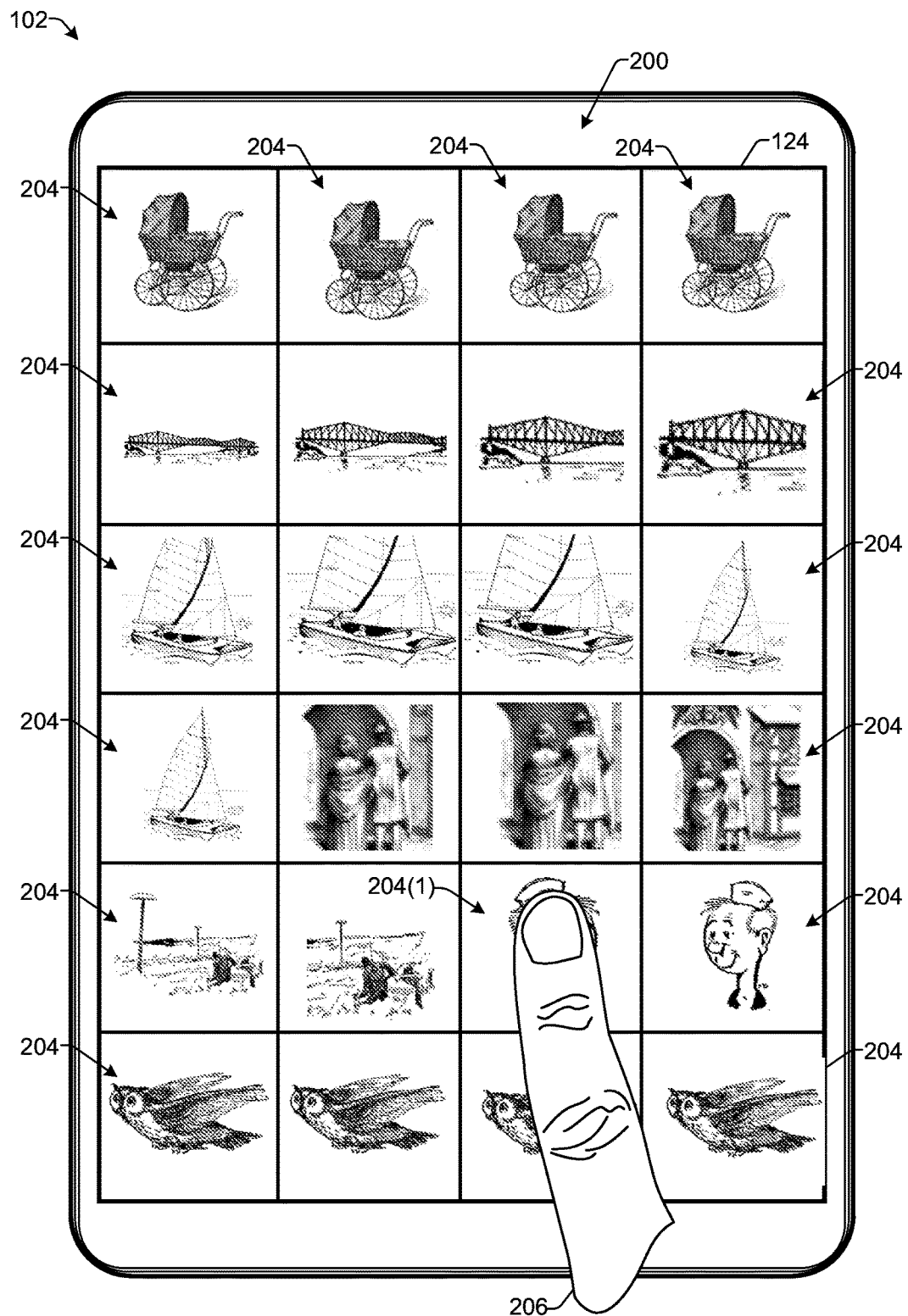
FIG. 2 illustrates an example GUI for viewing, selecting, and/or accessing content items according to some implementations.

FIG. 2 illustrates an enlarged example view of the electronic device 102 with an example GUI 202 presented on the display 124 according to some implementations. In this example, the GUI 200 is a gallery-type interface presented to enable the user 104 to view, access, or otherwise select a representation 204(1) of a particular content item out of a plurality of representations 204 of content items. In the illustrated example, the GUI 200 does not visually distinguish between representations 204 of content items that have been offloaded from the electronic device 102 and representations 204 of content items that have not yet been offloaded. For instance, it may not be readily apparent to the user that a particular content item has been offloaded to the network storage. In other examples, the representations 204 may be changed to indicate that the corresponding content items have been moved to the network storage, such as by placing a cloud symbol on the representations 204, graying out the representations 204, showing the representations 204 with dashed or broken lines, or the like. In some examples, the representations 204 may be thumbnails generated from the downsized content items and/or the full resolution content item stored on the electronic device. For instance, the thumbnails may be downsampled images representative of the content of the downsized content items stored on the electronic device, and in some cases may be substantially smaller in resolution than the downsized content items.

In some implementations, one or more additional GUIs may enable the user to interact with the electronic device 102 for additional content management on the electronic device 102. For instance, the user may be provided with the opportunity to select particular content items to be offloaded from the electronic device 102. As one example, a GUI may present representations 204 of a plurality of content items recommended for offloading in a ranked order, such as based on infrequency of use, amount of storage space consumed, or other criteria, as previously enumerated above.

In other examples, rather than presenting recommended content items for user selection and/or approval, the data management module may proceed with offloading recommended content items according the ranked order or based on other selection technique. As still another example, the electronic device 102 may automatically and dynamically offload a content item when a threshold minimum level of remaining free storage space is reached. For example, suppose that the user is using the electronic device to take photographs or video. Further, suppose that the electronic device 102 determines that the user is close to running out of storage space on the electronic device 102, e.g., has arrived at a threshold amount of remaining storage capacity. If the electronic device 102 is able to communicate with the network storage, the electronic device 102 may proceed with offloading one or more content items.

In the case that the display 124 is a touchscreen, the user may be able to use a finger 206 to scroll the GUI 200 to view other representations 204. Further, the user may use the finger 206 to tap on or otherwise select a particular representation 204 to access the corresponding content item. Thus, in the illustrated example, suppose that the user has selected representation 204(1), which corresponds to a particular offloaded content item. In response, the data management module 110 may obtain a larger resolution version of the content item from the network storage, such as is described below with respect to FIG. 3. Furthermore, in some cases the user may use the GUI 200 to specify that a full resolution version of a particular content item or set of content items remain in the local storage on the electronic device 102 so that the selected one or more content items are not downsized or offloaded.

Figure 3:
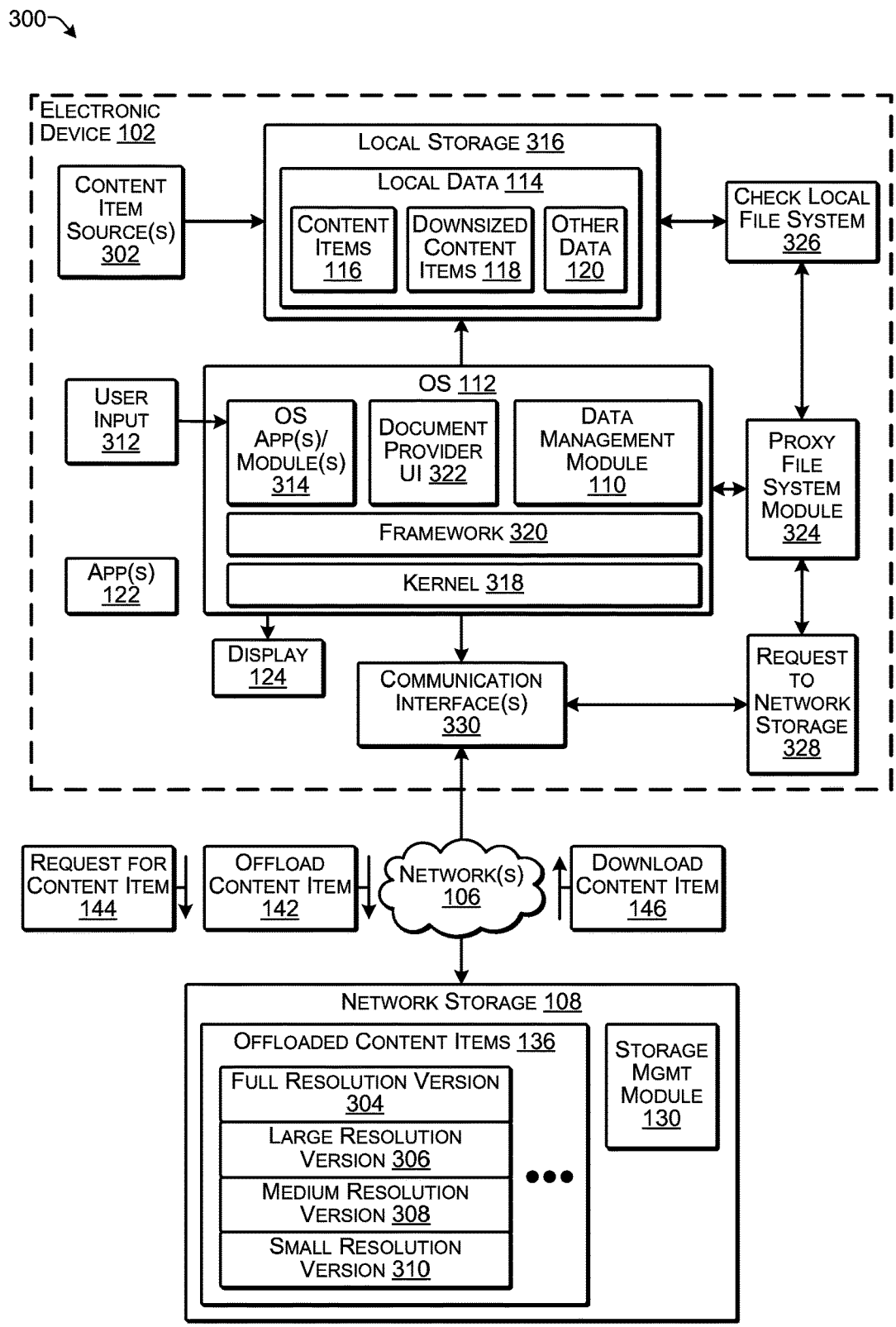
FIG. 3 is a block diagram illustrating retrieval of a content item that has been offloaded from the electronic device according to some implementations.

FIG. 3 illustrates an example system 300 that may correspond, at least in part, to the system 100 discussed above according to some implementations. For instance, as discussed above, the system 300 may enable downsizing content items and offloading of the full resolution content items 116 to the network storage 108, and subsequent downloading of one or more of the offloaded content items 136 back to the electronic device 102 when a higher resolution version is requested. The content items 116 may be initially received from a content item source 302. As one example, the content item source 302 may be a camera onboard or external to the electronic device 102; however, the content items 116 may be received from numerous other types of content item sources 302, which may be onboard or external to the electronic device 102, such as a microphone, removable computer-readable media, downloading over the one or more networks 106, or the like. As mentioned above, the content items 116 may be downsized by the data management module 110 to generate downsized content items 118.

Subsequently, as indicated at 142, the full resolution versions of the content items 116 may be offloaded to the network storage 108. Accordingly, the network storage 108 may store the offloaded content items 136. In some examples, the network storage 108 may store various different resolutions of each of the offloaded content items 136, such as a full resolution version 304, a large resolution version 306, a medium resolution version 308, and a small resolution version 310. As one example, the large resolution version 306 may be 75% of the full resolution size, the medium resolution version 308 may be 50% of the full resolution size, the small resolution version 310 may be 25% of the full resolution size, and the downsized content item 118 may be 5-15% of the full resolution size. However, any of numerous other ranges of various sizes may be used. Further, there may be more or fewer versions of each of the offloaded content items 136, other than the downsized version 118, the small resolution version 310, the medium resolution version 308, the large resolution version 306, and the full resolution version 304.

In the illustrated example, suppose that the user has made a user input 312 that invokes execution of an OS integrated application or other OS module 314 on the electronic device 102, such as a gallery module, a picture viewer, or other content item viewing module of the OS 112. In response, the OS module 314 may present information about at least some of the content items 116 and 118 stored on a local storage 316 of the electronic device 102. For example, one or more representations 204, such as thumbnails of the content items 116 and 118, may be presented to the user on the display 124, such as in a gallery GUI or any other type of user interface, e.g., as discussed above with reference to FIG. 2. Alternatively, in other examples, the downsized content items 118 may also serve as their own representations 204 in the gallery display.

As one example, suppose that the user selects, from the gallery GUI, a particular one of the representations 204 corresponding to a particular downsized content item 118, as discussed above with reference to FIG. 2. Further, suppose that the selection of the particular representation 204 causes module 314 to present the corresponding content item on the display 124. Further, suppose that the native resolution of the display 124 is substantially larger than the resolution of the downsized content item 118. For instance, suppose that a picture viewer application on the electronic device 102 is configured to present the full resolution versions of the content items. Accordingly, in response to the user selection, the data management module 110 may request a higher resolution version of the selected content item from the network storage 108, such as the full resolution version 304 of the selected content item. In response to receiving the request, the storage management module 130 may download or otherwise send the corresponding full resolution version 304 of the content item to the electronic device 102, as indicated at 146.

Alternatively, in other examples, the selection of the content item may not require the full resolution version, such as in the case of attaching the selected content item to an email. In such a situation, the data management module 110 might only request the medium resolution version 308, rather than the full resolution version 304. Typically, in the case of an OS module 314 being used to access a content item, the data management module 110 is able to determine, based on the module 314 being used to select a content item, which version of the content item to request from the network storage 108, e.g., the small resolution version 310, the medium resolution version 308, the large resolution version 306, or the full resolution version 304. If the particular version to download cannot be determined, a default may be to request the full resolution version 304.

In some examples, the OS 112 may include a kernel 318 that provides interoperability and connectivity between software, such as applications, and hardware of the electronic device 102, such as a processor, memory, and other components of the electronic device 102. Further, the OS 112 may include a framework 320 that enables execution of software, such as applications and system processes, in an applications layer, and that enables communication between the executing software and the kernel 318.

Further, the OS 112 may include a document provider user interface (UI) 322. The document provider UI 322 may be part of a storage access portion of the framework 320 provided by the OS 112 of the electronic device 102. The storage access framework enables users to browse and open documents, images, and other files available in the local storage 316 of the electronic device 102. The document provider UI 322 may be a standard UI that lets users browse and/or access files in a consistent way across different applications and providers. Network and local storages can use the document provider UI 322 to implement document providers for their services. Third party applications that desire to access a particular provider's documents may be able to integrate with the storage access framework provided by the document provider UI 322. Accordingly, the document provider UI 322 provides a uniform framework and interface for the OS applications and other OS modules 314 to interact with the content items 116 and/or the downsized content items 118. Furthermore, the document provider UI 322 may provide a uniform framework and interface for some types of the applications 122 that are not included in the OS 112, to access the content items 116 and/or the downsized content items 118. For instance, some of the applications 122 may be designed by their developers to interact directly with the document provider UI 322, as discussed additionally below with respect to FIG. 4.

In some implementations, a proxy file system module 324 may be implemented by the data management module 110 to execute on the framework 320 for providing a uniform proxy file system that can be used by the data management module 110, the OS applications or other modules 314, and/or the applications 122 when accessing or otherwise interacting with the content items 116 and 118. As one example, the proxy file system module 324 may implement a FUSE (File system in User SpacE) file system, which is available under the GNU General Public License. The FUSE file system is an operating system mechanism that enables creation of a file system without editing kernel code. This may be achieved by running the proxy file system module code in the user space (i.e., above the application supporting framework 320), so that the proxy file system module 324 provides a bridge to the actual kernel interfaces. Alternatively, in other examples, the proxy file system module 324 may be part of the kernel code. In either event, the proxy file system may enable additional logic to be performed when receiving access requests for the content items 116 and/or 118, such as checking for the requested version both locally and at the network storage, checking that the electronic device is connected to the networks 106, checking that the electronic device is able to communicate with the network storage 108, and so forth.

When using the proxy file system provided by the proxy file system module 324, an application or other module attempting to access a particular content item does not need to determine whether the particular content item has been offloaded to the network storage 108 or is stored in the local storage 316. Instead, the application or other module may merely submit a request to the proxy file system to access the content item and, as indicated at 326, the proxy file system module 324 may check the actual local file system to determine whether the requested version is in the local storage 316. If the requested version of the content item is not in the local storage 316, then as indicated at 328, the proxy file system module 324 may use one or more communication interfaces 330 of the electronic device 102 to send the request 144 for the requested version of the content item to the network storage 108. Thus, the proxy file system module 324 may perform some functions attributed to the data management module 110 above. Furthermore, if the electronic device 102 is not connected to the networks 106, or is otherwise unable to communicate with the network storage 108, the proxy file system module 324 may detect this occurrence, and may return the downsized version 118 of the selected content item, rather than sending the request 144 for the larger version of the content item.

Additionally, in other examples, if the proxy file system module 324 is not used, the data management module 110 may be configured to intercept requests for content items made by the applications or other OS modules 314 to the local file system. Thus, the data management module 110 may perform the functions of checking the local file system for the requested content item and sending a request to the network storage 108 if the requested version of the content item is not available locally. As still another example, the applications or other OS modules 314 may be configured to first check the local file system and if the specified version of the content item is not available locally, send the request 144 to the network storage 108.

Figure 4:
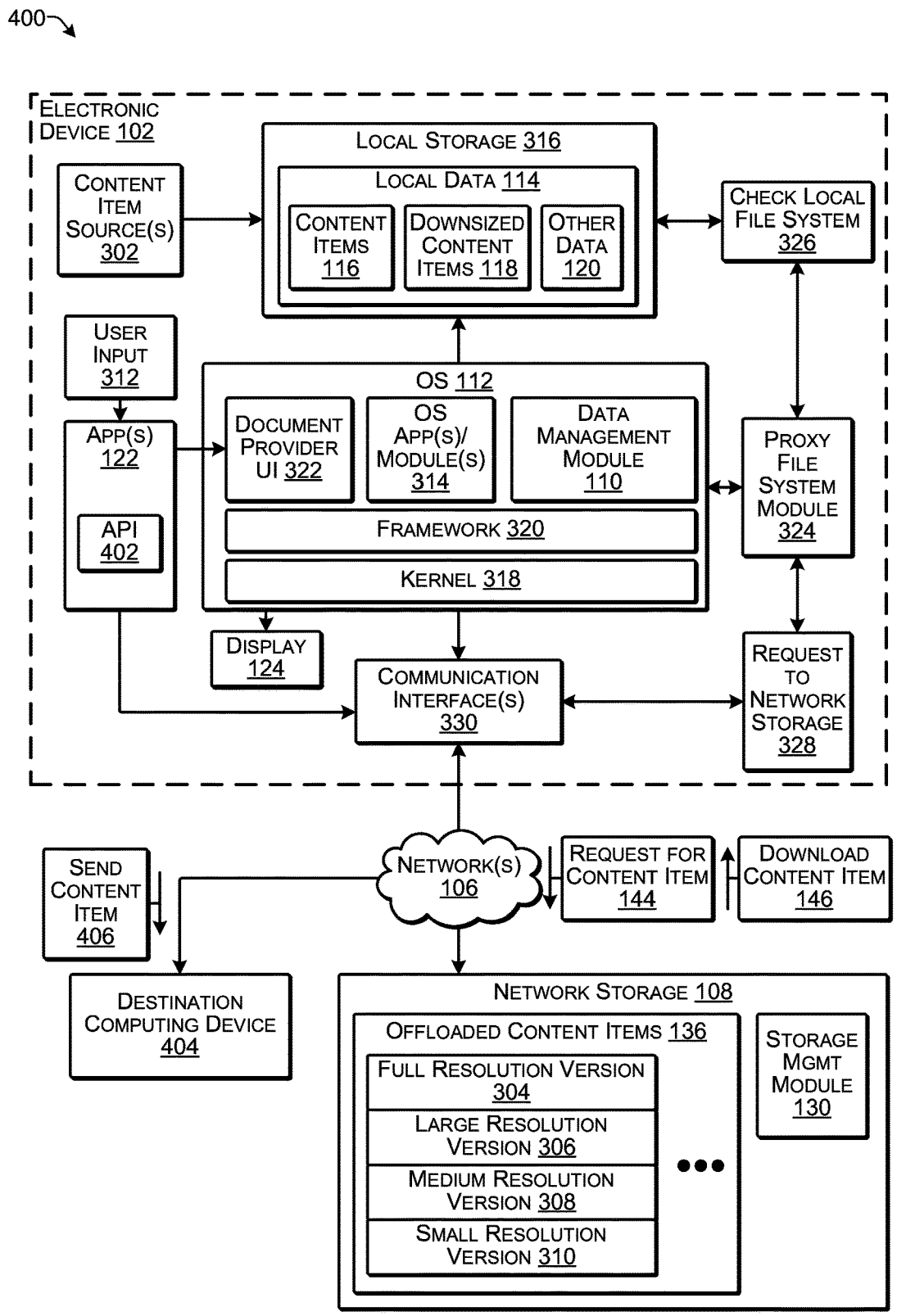
FIG. 4 is a block diagram illustrating retrieval of a content item that has been offloaded from the electronic device according to some implementations.

FIG. 4 illustrates an example system 400 that may correspond, at least in part, to the systems 100 and 300 discussed above according to some implementations. For instance, as discussed above, the system 400 may enable downsizing content items and offloading of the full resolution content items to the network storage 108, and subsequent downloading of one or more of the offloaded content items 136 back to the electronic device 102 when a higher resolution version is requested. In the example of FIG. 4, suppose that an application 122 is executing on the electronic device 102, and that the application 122 is configured to use the document provider UI 322 included with the OS 112 of the electronic device 102. For instance, as mentioned above, some third party applications 122 (i.e., applications that are not included or integrated with the OS 112) may be designed to use the document provider UI 322, such as to enable the user to select a content item to be used by the application 122.

As one example, the application 122 may be configured to interact with the document provider UI 322 in response to a user input 312, such as to cause presentation of the gallery GUI of FIG. 2 or to otherwise present one or more content items or representations of content items. For instance, suppose that the application 122 is a third party email application, and the user would like to attach a content item, such as a photograph or video, to an email that the user is preparing to send. The application 122 may employ the document provider UI 322 to present one or more content item representations to enable the user to select the content item to attach to the email. In addition, in some examples, the application 122 may request user input regarding a preferred size of the content item to be sent with the email, while in other examples, the application 122 may use a default content item size.

In some examples, the application 122 may communicate with the document provider UI 322 and/or the proxy file system module 324 regarding the size of the content item selected by the user to be attached to the email, while in other examples, the proxy file system module 324 may be configured to automatically return a particular size content item for the particular application 122. In response to receiving a request for the content item, the proxy file system module 324 may check to see whether the content item of the proper size is stored on the local storage 316, or whether the content item has been offloaded to the network storage 108. For instance, if a full resolution version of the content item is stored in the local storage, the application 122 may downsample the content item to the size specified by the user or to the default size.

On the other hand, if the content item has been offloaded, and the downsized version of the content item on the local storage is smaller than the size specified by the user or the default size, the proxy file system module may send a request for the content item to the network storage 108. For instance, suppose that the user specified that a small resolution version of the content item should be attached to the email. Accordingly, the proxy file system module 324 may send a request 144 to the network storage for the small resolution version 310 of the selected content item. Additionally, in the case that the size of the content item needed by the application 122 is not known, the proxy file system module 324 may by default request the full resolution version 304 of the content item.

When the requested version of the content item has been received by the proxy file system module 324, the received version of the content item may be stored in the local storage 316, and the location of the received content item may be provided to the application 122. The application 122 may attach the received version of the content item to the email and may send the email using the one or more communication interfaces 330. Additionally, in some cases, the application 122 may use an API 402 to obtain the image from the proxy file system and/or to send the image to a destination computing device 404, such as a webserver, email server, or the like. Thus, as indicated at 406, the received version of the content item may be sent with a communication to the destination computing device 404.

Additionally, in other examples, if the proxy file system module 324 is not used, the data management module 110 may be configured to intercept requests for content items made by applications 122 to the local file system. Thus, the data management module 110 may perform the functions of checking the local file system for the requested content item and sending a request 144 to the network storage 108 if the requested version of the content item is not available locally. Furthermore, while the above example is described in the context of an email application, numerous other types of applications 122 may be configured to interact with the document provider UI 322 for various other purposes or uses, as will be apparent to those of skill in the art having the benefit of the disclosure herein.

Figure 5:
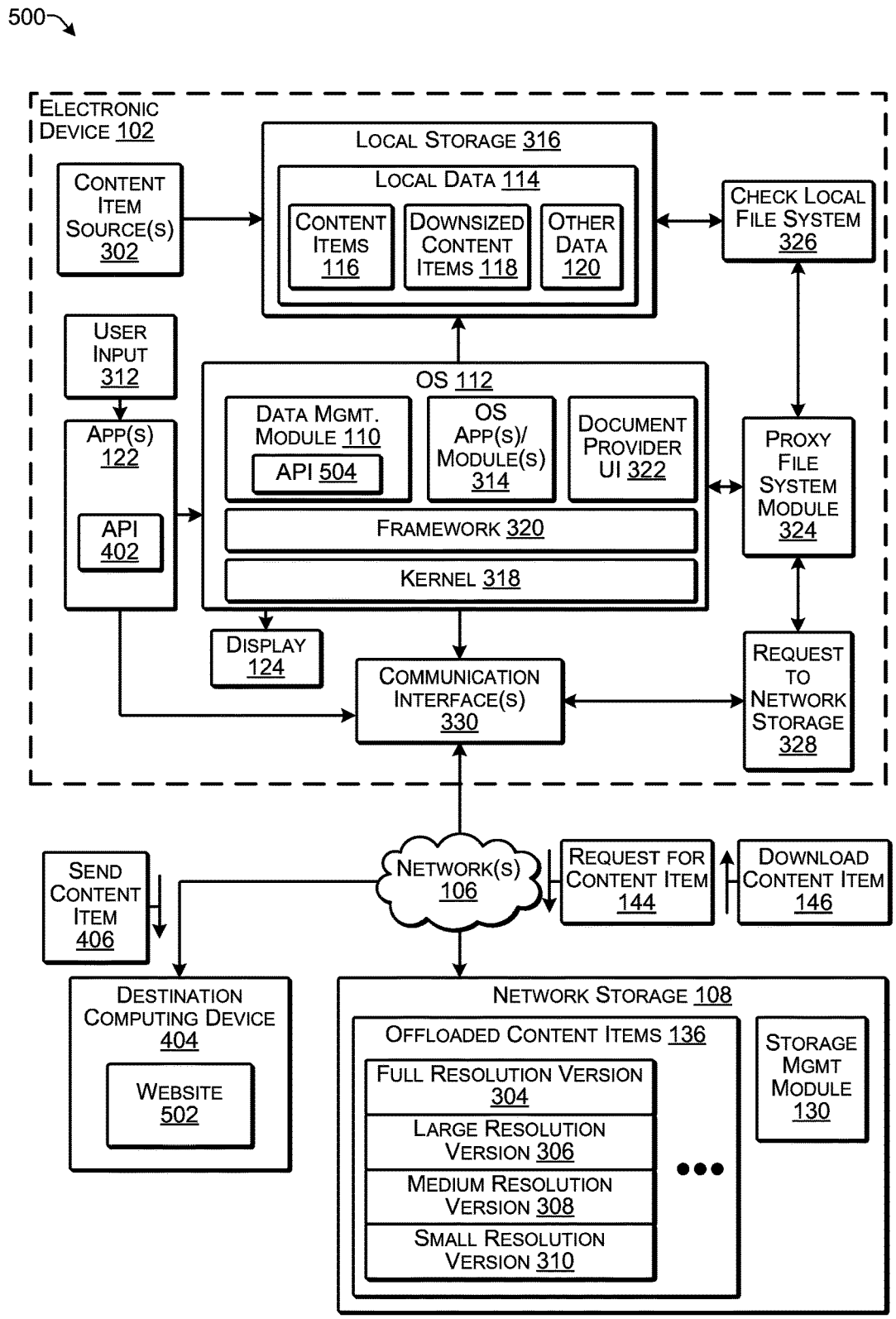
FIG. 5 is a block diagram illustrating retrieval of a content item that has been offloaded from the electronic device according to some implementations.

FIG. 5 illustrates an example system 500 that may correspond, at least in part, to the systems 100, 300, and 400 discussed above according to some implementations. For instance, as discussed above, the system 500 may enable downsizing content items and offloading of the full resolution content items to the network storage 108, and subsequent downloading of one or more of the offloaded content items 136 back to the electronic device 102 when a higher resolution version is requested. In the example of FIG. 5, suppose that an application 122 is executing on the electronic device 102, and that the application 122 is configured to call for one or more content items using the API 400, but there is no direct indication of the resolution requested by the API call. For example, in some cases, rather than using the document provider US 322, the API might cause the application 122 to, e.g., access the local storage 316 directly (i.e., via the proxy file system) for accessing the content items 116 and 118. Thus, in some cases, the application 122 may use the API 402 to obtain the content item and/or to send the content item to the destination computing device 404, such as for sending one or more content items from the electronic device 102 to the destination computing device 404.

Accordingly, various techniques may be used to determine the resolution or version of the content item to provide to the application 122. As one example, suppose that the application 122 is a social network application that the user may use to post content items, such as images or videos, to a social network website. Thus, the user may make a user input 312 to the application 122 to indicate that the user would like to select a content item to be posted by the application 122 to a website 502 at the destination computing device 404.

As one example, in response to the user input, the data management module 110 may analyze the read calls received from the application 122 to determine which of the read calls require a higher resolution version of a content item. For instance, for each application 122 and API 402, a typical signature or pattern of read calls may be determined such as based on observation of a large number of user interactions with the respective different applications. Subsequently, heuristics may be applied for determining when to provide a higher resolution version of a content item. For instance, suppose that the first two read calls from the application 122 are assumed to be for the purpose of generating a gallery type display, such as that shown in FIG. 2 above. Accordingly, the higher resolution versions of the content items called are not retrieved. Subsequently, suppose that a third read call from the application may be assumed to be for a particular content item that the user has selected for uploading to the website 502. Accordingly, the data management module 110 and/or the proxy file system module 324 may fetch, from the network storage 108, a higher resolution version of the content item corresponding to the read call, such as at a resolution typically used by the application 122. The version of the content item received from the network storage 108 may be provided to the application 122, and the application 122 may use the communication interfaces 330 to send the content item to the website 502. In some cases, the fetching of the content item from the network storage may be performed transparently to the user.

Further, rather than basing the heuristic on the number of read calls, the heuristic may employ or may take into consideration other metrics, such as the number of times a particular file name has been called. For instance, if a particular file name has been called three times, the first two calls might be assumed to be for a gallery presentation, while the third call might be assumed to be for uploading the specified content item, and therefore may trigger fetching of a larger resolution version from the network storage 108.

As another alternative, the data management module 110 and/or the proxy file system module 324 may determine which version of a content item to provide based on the type of file system calls made by the application. For instance, an "open directory" call may be used initially to access all the content items in a specified directory, such as for populating a gallery view. A subsequent "read" call for a specific file, on the other hand, may be assumed to be the result of a user select on the specific file, and therefore, a larger resolution versions of the corresponding content item may be fetched from the network storage.

In the two foregoing examples, the application and API do not require any changes or added functions to work within the implementations herein. In other examples, the application 122 and/or the API 402 may be configured to request a particular size of the content item. As one example, the requested size may be part of the file name of the requested content item. For instance, if the original file name of the content item is "image1.jpg", the application 122 may request a particular size of this content item using a file name format, such as "image1@400×300.jpg". In some cases, a content item version of 400×300 pixel resolution may have already been created and stored at the network storage 108 using the same name "image1 @400×300.jpg", and in such a case, the file may be simply sent to the electronic device. In other cases, a version of the content item in the requested 400×300 pixel receipt of the request from the application 122. Further, while the file name may be one technique for specifying the desired resolution, other techniques will be apparent to those of skill in the art having the benefit of the disclosure herein.

As still another alternative, in response to receiving a read call for a content item, rather than returning the content item, the data management module 110 and/or the proxy file system module 324 may return a whitespace image or other image having a watermark or other identifying indicator. For instance, one or more of the content items 116 may be a whitespace image that includes a watermark, a coded character sequence, tagging indictor, or the like. The application 122 will typically present the requested content item on the display 124 of the electronic device 102. Accordingly, since the application 122 typically instructs the electronic device 102 to present the image on the display 124 at a particular resolution, the OS 112 will receive this resolution information from the application 122 and can provide this information to the proxy file system module 324 to fetch the version of the content item corresponding to the resolution specified by the application 122 for presenting the content item on the display 124. As one example, the application 122 may indicate that the particular image should be displayed at a specified resolution, and the watermarking or other identifying indicator in the whitespace image may provide an indication of the particular content item that should be provided at the specified resolution.

As still another alternative, the data management module 110 may provide a service, such as via an API 504, used by the data management module 110 that can perform some functions of the document provider UI 322, but without the application 122 having to hand over control to the document provider UI 322. For instance, the service may receive a read call directly from the application 122 and may perform functions similar to the proxy file system module discussed above by referring first to the local storage 316 for a specified content item, and then to the network storage 108, if necessary to retrieve a content item having a size specified by the application 122.

As still another alternative, the OS 112 may reference the content items 136 using a custom image format. For instance, rather than containing the actual content of a content item, the custom image format may merely contain a link to the network storage 108 along with an asset identifier (ID) that identifies a particular content item 136 stored at the network storage. Thus, the asset ID and the link (e.g., a URL—uniform resource locator) may be embedded within the image format and may identify a particular content item and the network location of the content item to be returned to in response to a request to display the particular image. Subsequently, when the electronic device 102 or another computing device is to present the content item on a display, the link and the asset ID may be used to query the network storage 108 to obtain the actual image content in the appropriate resolution. Accordingly, the content item at the appropriate resolution may be returned to the device that is attempting to present the content item. Further, while several different techniques have been described herein for returning appropriate versions of a content item, variations of these techniques, as well as other techniques will be apparent to those of skill in the art having the benefit of the disclosure herein.

Figure 6:
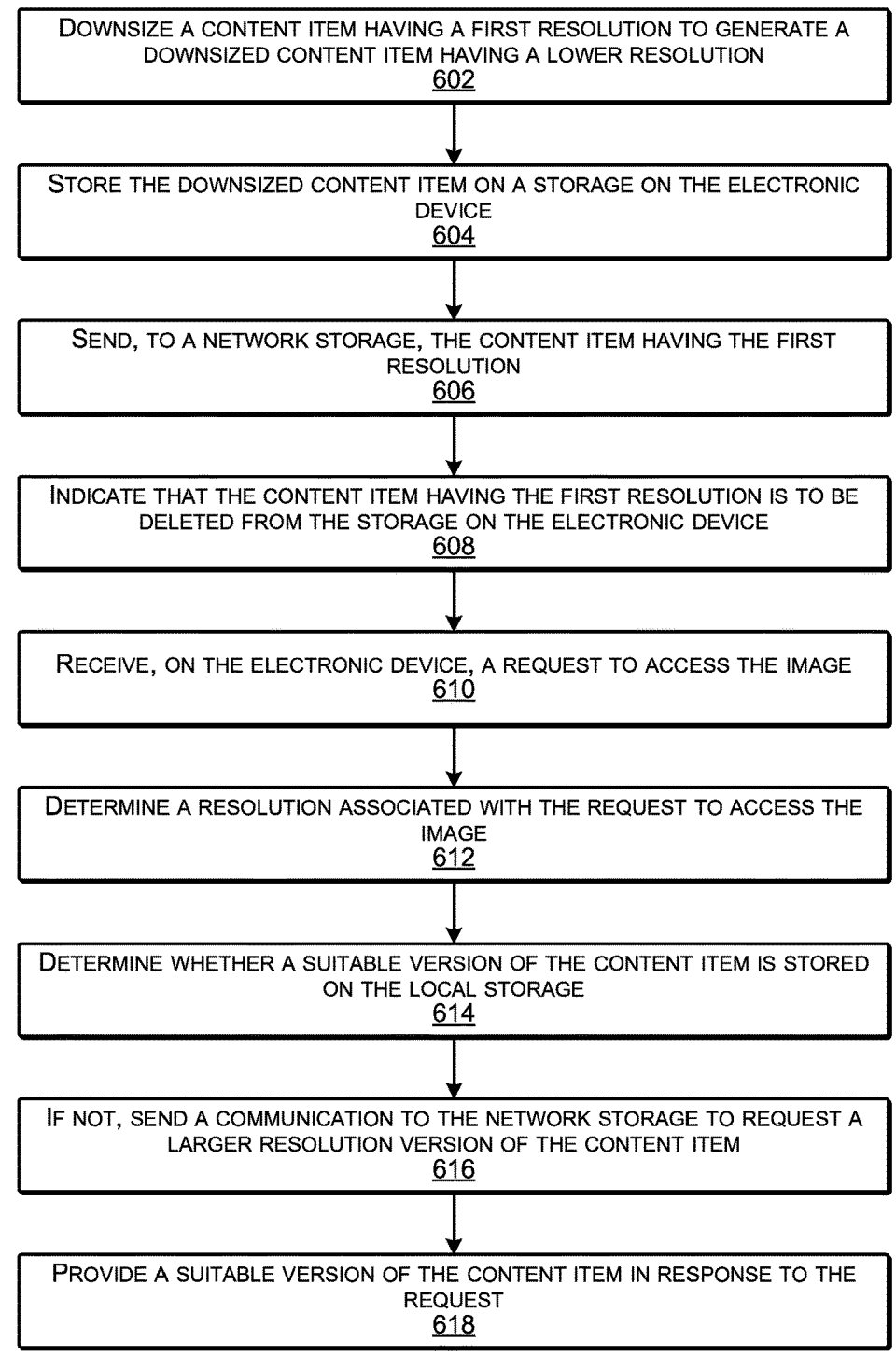
FIG. 6 is a flow diagram illustrating an example process for managing content on an electronic device according to some implementations.

FIG. 6 is a flow diagram illustrating an example process for managing content on an electronic device according to some implementations. The process is illustrated as a collection of blocks in a logical flow diagram, which represents a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, architectures and systems described in the examples herein, although the process may be implemented in a wide variety of other environments, architectures and systems.

FIG. 6 is a flow diagram illustrating an example process 600 for content management according to some implementations. In some examples, the process may be executed by the electronic device 102 or by another suitable computing device.

At 602, the electronic device may downsize a content item having a first resolution to generate a downsized content item having a lower resolution. Any of various suitable downsizing techniques may be used to generate a lower resolution and/or more compressed version of the content item, which will consequently occupy a substantially smaller storage area in the local storage.

At 604, the electronic device may store the downsized content item on a storage on the electronic device.

At 606, the electronic device may send, to a network storage, the content item having the first resolution. In some examples, the content item having the first resolution may have already been sent to the network storage, such as when backing up the local storage of the electronic device.

At 608, the electronic device may indicate that the content item having the first resolution is to be deleted from the storage on the electronic device, while the lower resolution version of the content item is maintained in the local storage. For instance, the content item having the higher resolution may be marked for deletion, or otherwise indicated to be ready to be deleted from the local storage, thereby freeing up the storage space where the content item is stored.

At 610, the electronic device may receive, on the electronic device, a request to access the content item. In some examples, the electronic device may include a proxy file system executed, e.g., in a user space on the electronic device. The request to access the content item may be received by the proxy file system for a content item corresponding to the downsized content item. For instance, an application or other module executing on the electronic device may request to access the content item for various purposes, as discussed above.

At 612, the electronic device may determine a resolution associated with the request to access the content item. For example, the proxy file system module and/or the data management module may determine a content item resolution corresponding to the request. As one example, the desired resolution of the content item may be determined based at least in part on identifying the application from which the request is received. As another example, the desired resolution of the content item may be determined based at least in part on a number of read calls for the content item received from the module prior to receiving the request and/or whether the request is for a single file or a directory of files. As still another example, the desired resolution of the content item may be determined at least in part, by returning an image, such as a whitespace image, having an indicator embedded therein, receiving a request to display the whitespace image on a display, and determining the content item resolution based at least in part on the request to display the whitespace image. As still another example, the desired resolution of the content item may be determined based on the requesting module including the desired resolution, at least in part, in a file name of the image. As still another example, the desired resolution of the content item may be determined by a service provided by the OS, e.g., the request may be made to a service provided by the OS of the electronic device, and the request may indicate, to the service, the desired resolution of the content item. As still another example, the desired resolution of the content item may be determined based on a the request using a file format that includes a network location at which is stored a version of the image corresponding to the resolution associated with the request. Further, while several examples are discussed above, other techniques for determining the appropriate resolution for a content item will be apparent to those of skill in the art having the benefit of the disclosure herein.

At 614, the electronic device may determine whether a suitable version of the content item is stored on the local storage. For example, the proxy file system module and/or the data management module may first check a local file system of the electronic device for a locally stored content item having a resolution greater than or equal to the content item resolution corresponding to the request.

At 616, if a suitable version is not on the local storage, the electronic device may send a communication to the network storage to request a larger resolution version of the content item. For example, based at least in part on failure to locate a suitable locally stored version content item through the local file system, the proxy file system module and/or the data management module may send, to the network storage, a request for a version of the content item having the resolution greater than or equal to the content item resolution corresponding to the request.

At 618, the electronic device may provide a suitable version of the content item in response to the request. For instance, in response to the communication from the electronic device, the network storage may send the requested version of the content item to the electronic device, and the electronic device may provide the requested version of the content item to the requesting application or other module.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
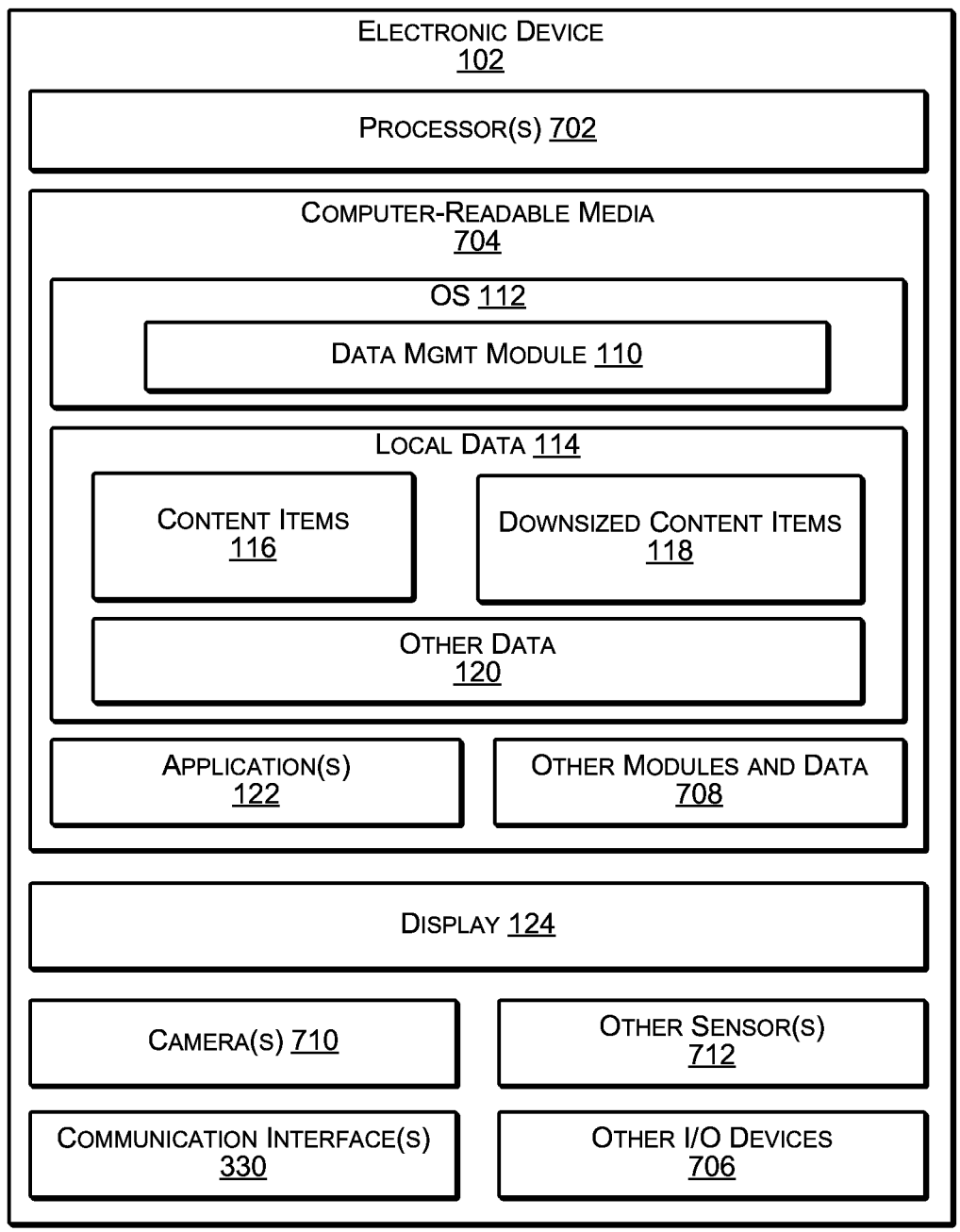
FIG. 7 illustrates select components of an example electronic device according to some implementations.

FIG. 7 illustrates select example components of the electronic device 102 that may implement the functionality described above according to some examples. The electronic device 102 may be any of a number of different types of computing devices, as enumerated above. In the example of FIG. 7, the electronic device 102 includes a plurality of components, such as at least one processor 702, one or more computer-readable media 704, the one or more communication interfaces 330, and one or more input/output (I/O) devices 706. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the computer-readable media 704.

The computer-readable media 704 may include, at least in part, the local storage 316 discussed above. Depending on the configuration of the electronic device 102, the computer-readable media 704 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 704 may include, but is not limited to, RAM, ROM, EEPROM, flash memory, solid-state storage, magnetic disk storage, optical storage, and/or other computer-readable media technology. Further, in some cases, the electronic device 102 may access external storage, such as RAID storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules, or components that may be executed by the processor 702. Further, when mentioned, non-transitory computer-readable media exclude media such as energy, carrier signals, electromagnetic waves, and signals per se.

The computer-readable media 704 may be used to store and maintain any number of functional components that are executable by the processor 702. In some implementations, these functional components comprise instructions or programs that are executable by the processor 702 and that, when executed, implement operational logic for performing the actions attributed above to the electronic device 102. Functional components of the electronic device 102 stored in the computer-readable media 704 may include the data management module 110 as discussed above. Additional functional components may include the operating system 112 for controlling and managing various functions of the electronic device 102 and for enabling basic user interactions with the electronic device 102. In some examples, the data management module 110 may be one or more modules of the operating system 112, while in other examples, some or all of this module may be separate from the operating system 112.

The computer-readable media may store user data, such as the content items 116, downsized content items 118, and other data 120. In addition, the computer-readable media 704 may also store data, data structures and the like, that are used by the functional components. Depending on the type of the electronic device 102, the computer-readable media 704 may also store other functional components and data, such as the applications 122 and other modules and data 708, which may include a proxy file system module, as well as programs, drivers, etc., and other data used or generated by the functional components. Further, the electronic device 102 may include many other logical, programmatic and physical components, of which those described are merely examples that are related to the discussion herein.

The communication interface(s) 330 may include one or more interfaces and hardware components for enabling communication with various other devices, such as over the network(s) 106 or directly. For example, the communication interface(s) 330 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 7 further illustrates that the electronic device 102 may include the display 124. Depending on the type of computing device used as the electronic device 102, the display 124 may employ any suitable display technology. For example, the display 124 may be a liquid crystal display, a plasma display, a light emitting diode display, an OLED (organic light-emitting diode) display, an electronic paper display, or any other suitable type of display able to present digital content thereon. In some examples, the display 124 may have a touch sensor (not shown) associated with the display 124 to provide a touchscreen display configured to receive touch inputs for enabling interaction with a GUI presented on the display 124. Accordingly, implementations herein are not limited to any particular display technology. Alternatively, in some examples, the electronic device 102 may not include a display.

The electronic device 102 may further include one or more cameras 710, and other sensors 712 such as a GPS device, accelerometer, gyroscope, compass, proximity sensor, and the like. The electronic device 102 may further include one or more other I/O devices 706. The I/O devices 706 may include speakers, a microphone, a camera, and various user controls (e.g., buttons, a joystick, a keyboard, a keypad, etc.), a haptic output device, and so forth. Additionally, the electronic device 102 may include various other components that are not shown, examples of which may include removable storage, a power source, such as a battery and power control unit, and so forth.

Figure 8:
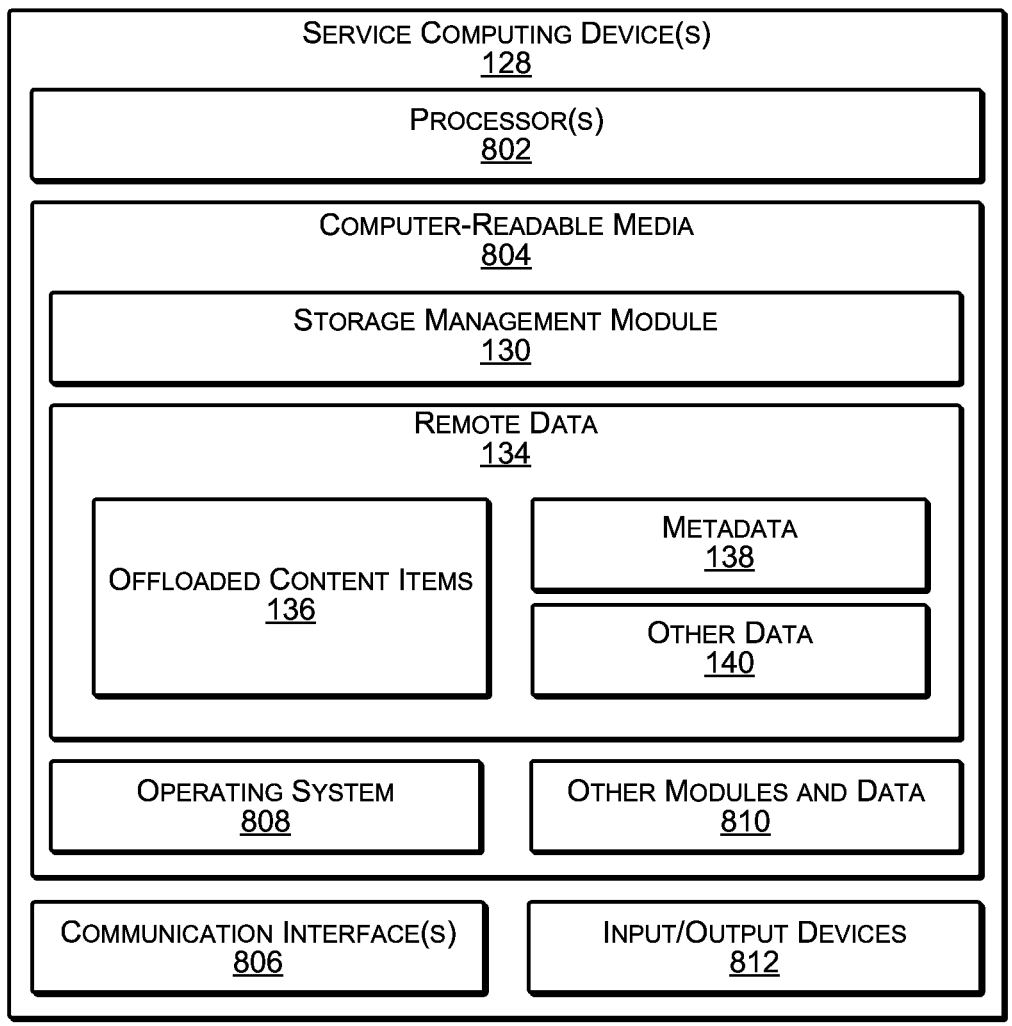
FIG. 8 illustrates select components of one or more example service computing devices according to some implementations.

FIG. 8 illustrates select components of the one or more service computing device(s) 128 that may be used to implement some functionality of the content management service described herein. In some examples, the service computing device 128 may be operated by a service provider that provides the network storage service, and may include one or more servers or other types of computing devices that may be embodied in any number of ways. For instance, in the case of a server, the modules, other functional components, and data storage (e.g., storage devices 130) may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 128 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 128 may be located together or separately, and organized, for example, as virtual servers, server banks, and/or server farms. The described functionality may be provided by the servers of a single entity or enterprise, or may be provided by the servers and/or services of multiple different buyers or enterprises.

In the illustrated example, each service computing device 128 may include, or may have associated therewith, one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include the storage devices 132 discussed above with respect to FIG. 1. In some cases, the storage devices 132 may be at the same location as the service computing device(s) 128, while in other examples, the storage devices 132 may be remote from the service computing device(s) 128. Further, the computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 128, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 128. Functional components stored in the computer-readable media 804 may include the data storage module 130. Additional functional components stored in the computer-readable media 804 may include an operating system 808 for controlling and managing various functions of the service computing device 128.

In addition, the computer-readable media 804 may store data used for performing the functions and services described herein. Thus, the computer-readable media 804 may store the remote user data 134, which may include offloaded content items 136, metadata 138, and other data 140. The service computing device 128 may also include or maintain other functional components and data, such as other modules and data 810, which may include programs, drivers, etc., and the data used or generated by the functional components. Further, the service computing device 128 may include many other logical, programmatic, and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

The service computing device 128 may further be equipped with various input/output (I/O) devices 812. Such I/O devices 812 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device comprising:
one or more processors; and
a non-transitory computer-readable medium storing instructions executable by the one or more processors, wherein the instructions program the one or more processors to:
select, by the electronic device, a content item from a plurality of content items based on at least one of how much storage space each content item uses, or an amount of storage space remaining on the electronic device;
downsize a first version of the selected content item having a first resolution to generate a second version of the selected content item having a second resolution, wherein the second resolution is lower than the first resolution;
store the second version of the selected content item on a storage on the electronic device;
send, to a network storage, the first version of the selected content item having the first resolution;

indicate that the first version of the selected content item having the first resolution is to be deleted from the storage on the electronic device;
receive, from an application executing on the electronic device, a request to access the selected content item;
determine, by the electronic device, a content item resolution based at least in part on identifying the application from which the request is received; and
send, to the network storage, a communication for a particular version of the content item when the determined content item resolution is higher than the second resolution.

2. The electronic device as recited in claim 1, further comprising a display, wherein the instructions further program the one or more processors to:
present, on the display, a graphic user interface (GUI) including a representation of the second version of the selected content item;
receive, via the GUI, a selection of the representation; and
send a request to the network storage for the content item having the first resolution based at least in part on the selection.

3. The electronic device as recited in claim 1, wherein the instructions further program the one or more processors to:
provide a proxy file system executed, at least in part, in a user space on the electronic device, wherein the request is towards the proxy file system;
based at least in part on the request, check a local file system of the electronic device for a locally stored content item having a resolution greater than or equal to the content item resolution corresponding to the request; and
based at least in part on failure to locate the locally stored content item through the local file system, send, to the network storage, the communication for the particular version of the content item having a resolution greater than or equal to the content item resolution.

4. The electronic device as recited in claim 1, wherein the content item is selected from the plurality of content items based on how often each content item has been accessed.

5. The electronic device as recited in claim 1, wherein the instructions further program the one or more processors to determine the content item resolution based at least in part on whether the request is for a single file or a directory of files.

6. The electronic device as recited in claim 1, wherein the instructions further program the one or more processors to determine the content item resolution, at least in part, by:
returning a first content item having an indicator embedded in the first content item;
receiving a request to display the first content item on a display; and
determining the content item resolution based at least in part on the request to display the first content item.

7. A method comprising:
selecting, by a device, an image from a plurality of images based on at least one of how much storage space each image uses, or an amount of storage space remaining on the device;
storing a first version of the selected image having a first resolution in a storage on the device;
downsizing the first version of the selected image having the first resolution to generate a second version of the selected image having a second resolution that is lower than the first resolution;
sending, to a network storage, the first version of the selected image having the first resolution;
indicating that the first version of the selected image having the first resolution is to be deleted from the storage on the device, wherein the second version of the selected image is maintained in the storage on the device;
receiving a request to access the selected image;
determining, by the device, a resolution based at least in part on identifying an application from which the request is received; and
sending a communication to the network storage for a version of the image when the determined resolution is higher than the second resolution.

8. The method as recited in claim 7, further comprising downsizing the second version of the selected image to generate a third version of the selected image when a threshold period of time expires after the downsizing of the first version of the selected image.

9. The method as recited in claim 7, wherein the resolution associated with the request is included, at least in part, in a file name of the image included with the request.

10. The method as recited in claim 7, wherein the request is made to a service provided by an operating system of the device, the request indicating, to the service, the resolution associated with the request.

11. The method as recited in claim 7, wherein the request specifies the image using a file format that includes a network location at which a version of the image corresponding to the resolution is stored.

12. The method as recited in claim 7, wherein determining the resolution associated with the request to access the image is based at least in part on whether the request is for a particular image or for a plurality of images including the particular image.

13. The method as recited in claim 7, further comprising:
prior to receiving the request for the image, receiving an earlier call for the image; and
in response at least in part to the earlier call, presenting the image at least in part via a document provider user interface.

14. One or more non-transitory computer-readable media maintaining instructions that, when executed by one or more processors, program the one or more processors to:
select, by an electronic device, a content item from a plurality of content items based on at least one of how much storage space each content item uses, or an amount of storage space remaining on the electronic device;
downsize a first version of the selected content item having a first resolution to generate a second version of the selected content item having a second resolution, wherein the second resolution is lower than the first resolution;
store the second version of the selected content item on a storage on the electronic device;
send, to a network storage, the first version of the selected content item having the first resolution;
indicate the first version of the selected content item having the first resolution is to be deleted from the storage on the electronic device;
receive, on the electronic device, a request to access the selected content item;
determine, by the electronic device, a resolution associated with the request to access the selected content item, wherein the resolution associated with the request is determined based at least in part on identifying an application from which the request is received;

determine that the second version of the selected content item maintained in the storage on the electronic device has a resolution lower than the resolution associated with the request; and send a communication to a network storage for a version of the selected content item having a resolution higher than the second resolution.

15. The one or more non-transitory computer-readable media as recited in claim 14, wherein the instructions further program the one or more processors to determine the resolution associated with the request based at least in part on whether the request is for a particular content item or for a plurality of content items including the particular content item.

16. The one or more non-transitory computer-readable media as recited in claim 14, wherein the instructions further program the one or more processors to determine the resolution associated with the request based, at least in part, on the resolution being included in a file name of the content item included with the request.

17. The one or more non-transitory computer-readable media as recited in claim 14, wherein the instructions further program the one or more processors to determine the resolution associated with the request, at least in part, by:

returning a first content item having an indicator embedded in the first content item;

receiving a request to display the first content item having the indicator on a display; and determining the resolution based at least in part on the request to display the first content item.

18. The one or more non-transitory computer-readable media as recited in claim 14, wherein the instructions further program the one or more processors to determine the resolution associated with the request based at least in part on the request identifying the content item using a file format that includes a network location at which a version of the content item corresponding to the resolution associated with the request is stored.

* * * * *